United States Patent Office

Re. 28,268
Reissued Dec. 10, 1974

28,268

DEVICE FOR SIGNALING NEED FOR CLEANING OR REPLACING SUCTION CLEANER DUST BAG

Hubert Marc William Autrand, La Garenne-Colombes, France, assignor to Aktiebolaget Electrolux, Stockholm, Sweden Original No. 3,587,514, dated June 28, 1971, Ser. No. 873,309, Nov. 3, 1969. Application for reissue Nov. 8, 1973, Ser. No. 414,170

Claims priority, application Sweden, Nov. 8, 1968, 15,154/68

Int. Cl. G08b *3/00*

U.S. Cl. 116—67 R 4 Claims

Matter enclosed in heavy brackets [ ] appears in the original patent but forms no part of this reissue specification; matter printed in italics indicates the additions made by reissue.

ABSTRACT OF THE DISCLOSURE

This invention relates to a device for indicating or signaling the need for cleaning or replacing a suction cleaner dust bag due to dirt trapped therein. The device produces an audible signal when a valve moves from a closed to an open position to allow air to flow to the atmosphere through a passageway from the interior of the suction cleaner. The valve forms a part of an armature member which is magnetically attracted by a magnet and is movable therefrom. A diaphragm is movable from a first position to one of several second positions responsive to the pressure differential at opposite sides of the dust bag, the diaphragm in its second positions acting on the armature member. When the valve is moved quickly from its closed position to a wide open position air flows at a high velocity through the passageway to cause the device to produce an audible sound of high intensity. Such quick movement of the valve from its closed to its open position is effected simultaneously with movement of the armature member from the magnet by a force which is dependent upon the particular second position to which the diaphragm is moved and which exceeds the force magnetically attracting the armature member to the magnet.

BACKGROUND OF THE INVENTION

Field of the Invention

It is known to provide a signaling or indicating device which functions responsive to the pressure differential at opposite sides of a suction cleaner dust bag. This pressure differential becomes increasingly greater responsive to dirt trapped at the side thereof initially contacted by the air. The indicating device may produce an audible signal responsive to flow of air in a passageway having a valve which, as the pressure differential builds up, gradually moves from its closed toward its open position. This is objectionable because, under these conditions, the audible sound produced by the signaling device initially is weak and gradually increases in intensity as the rate at which the air flows through the passageway increases. In an indicating or signaling device of this type, it is difficult to know precisely at what point the dust bag should be cleaned or replaced due to dirt trapped therein.

SUMMARY OF THE INVENTION

It is an object of my invention to provide an improved device for indicating the need for cleaning or replacing a suction cleaner dust bag due to dirt trapped therein. I accomplish this by providing an indicating device comprising a magnet and an armature member which is adapted to be magnetically attracted by the magnet and is movable therefrom, the device becoming operable to move the armature member from the magnet to produce the indication positively by means responsive to a force which is dependent upon the pressure differential at opposite sides of the dust bag and exceeds the force magnetically attracting the armature member to the magnet.

DESCRIPTION OF THE PREFERRED EMBODIMENT

Figure 1:
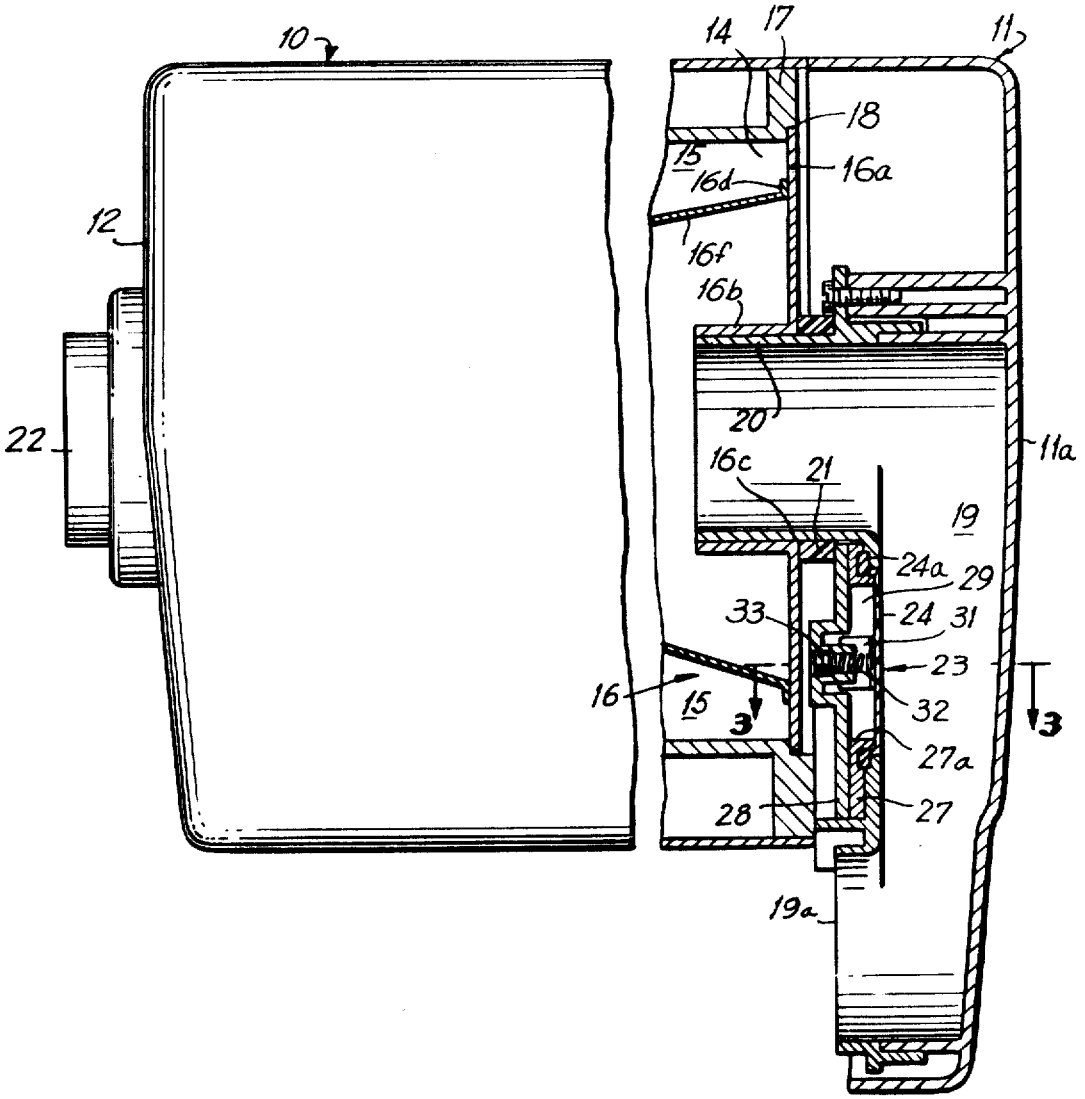
FIG. 1 is a fragmentary elevational view of a suction cleaner, partly in section, embodying my invention.

Referring to FIG. 1 of the drawing, the suction cleaner which I have shown embodying my invention comprises a casing 10 having front and rear end covers 11 and 12, respectively, secured thereto in any suitable manner. The front end cover 11 coacts with an open end 14 of the casing 10 when it is in its closed position illustrated in FIG. 1. A space 15 within the casing 10, which is located adjacent to its open end 14, is adapted to receive a dirt-collecting member 16.

Although I do not wish to be limited thereto, the dirt-collecting member 16 may comprise an end closure 16a formed of suitable sheetlike material like cardboard, for example, having a pair of flaps 16b cut therefrom which, when moved from the plane of the end closure 16a, define an opening 16c. The open end 16d of a paper dust bag 16f is fixed in any suitable manner, as by an adhesive, to the inner face of the end closure 16a.

The casing 10 is provided with a collar or ring 17 at the open end 14 thereof which is formed to provide a seat 18 in which the end closure 16a is positioned with the dust bag 16f extending within the space 15 of the casing 10. The front end cover 11 is formed with a U-shaped passageway 19, one arm of which is defined by a tubular member 20 projecting inward from the end cover 11. The end cover 11 is provided with a collar or ring 21 which functions as a sealing gasket and is disposed about the tubular member 20 and bears against the end closure 16a when the cover 11 is in its closed position shown in FIG. 1. The ring 21 may be formed of a material like foamed plastic, for example, to provide an airtight seal at the end closure 16a about the tubular member 20.

When the end cover 11, which is removably mounted on the casing 10 in any suitable manner, is moved from its open position to its closed position, the inner free end of the tubular member 20 will engage the flaps 16b and move them inward to form the opening 16c in the end closure 16a, as shown in FIG. 1. The U-shaped passageway 19, which may be referred to as a suction passageway, is adapted to receive dirt-laden air at its air inlet end 19a. The dirt-laden air is drawn through the passageway 19 into the interior of the casing 10 by a motor-fan unit (not shown) which may be located adjacent to the dirt-collecting member 16.

During operation of the suction cleaner, air is drawn into the interior of the casing 10 through the U-shaped passageway 19 in the front end cover 11. Dirt entrained in the air during cleaning collects in the dust bag 16f, and air free of such dirt passes through the dust bag into the space 15 and flows through the casing 10 and eventually is discharged through an end opening 22 in the rear end cover 12. Since dirt is trapped at the inner surface of the dust bag 16f there is a tendency for the dirt-collecting member 16 to become clogged during operation of the cleaner, the pressure differential at opposite sides of the dist bag 16f becoming increasingly greater responsive to dirt trapped at the inner side of the dust bag which is initially contacted by the dirt-laden air.

In accordance with my invention, in order to indicate when the dirt-collecting member should be cleaned or replaced by a new dirt-collecting member, I provide a device 23 which automatically is rendered operable responsive to a predetermined pressure differential at opposite sides of the dust bag 16f to produce a signal or other suitable indication. The device 23 is associated with the front end cover 11 and forms a unitary part thereof.

The indicating device 23 comprises a member 24 formed of elastomeric material, such as rubber or soft plastic, for example, which serves as a diaphragm having a beaded rim 24a positioned at an upright wall 25 of the suction passage 19 about an opening 26 therein. Hence, the suction passageway 19 is defined in part by the diaphragm 24 which is held against the wall 25 at the opening 26 therein by an intermediate plate 27 of the shape shown in FIG. 2, such plate having a flange 27a about an opening 27b therein which coacts with the wall 25 to hold the rim 24a therebetween.

Figure 2:
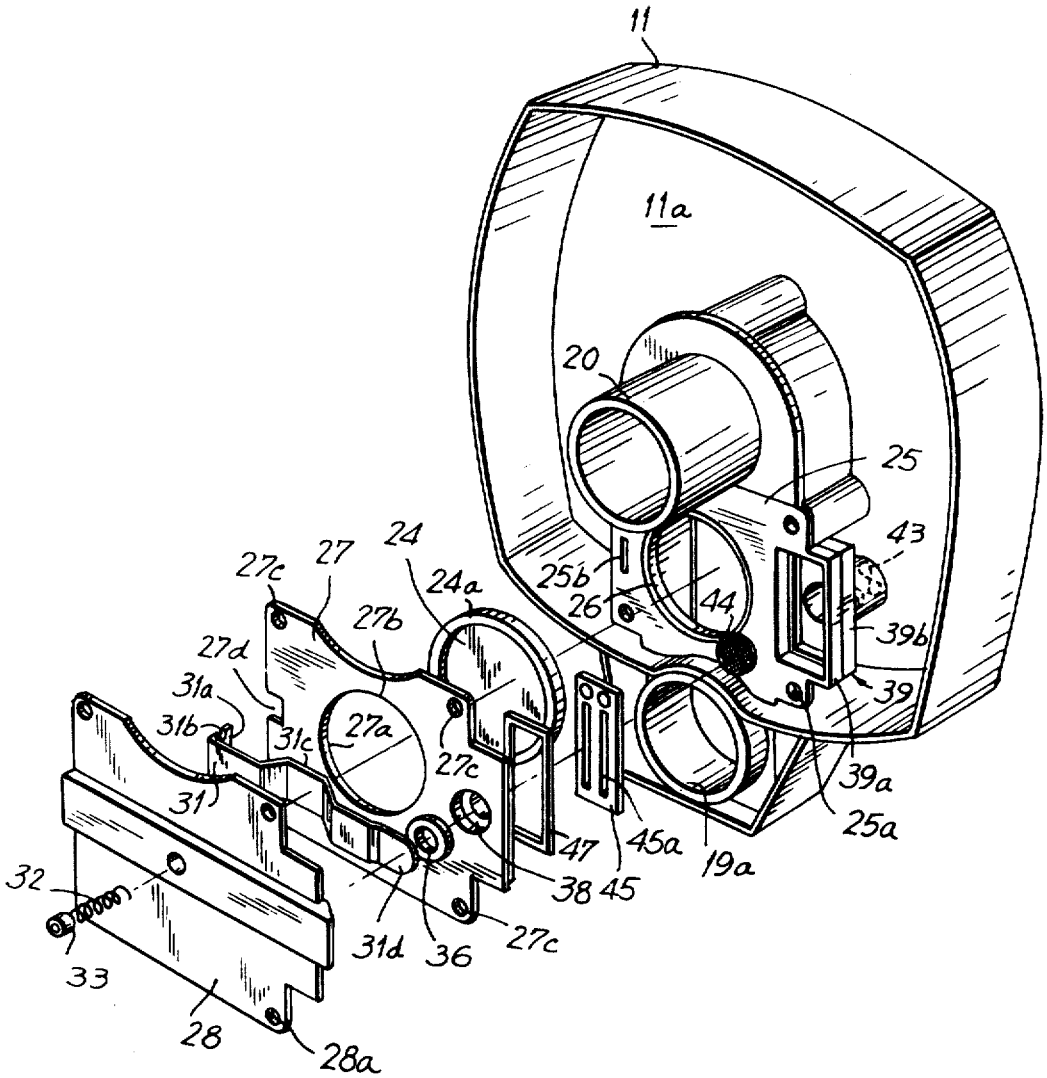
FIG. 2 is an exploded perspective view of parts shown in FIG. 1.
Figure 3:
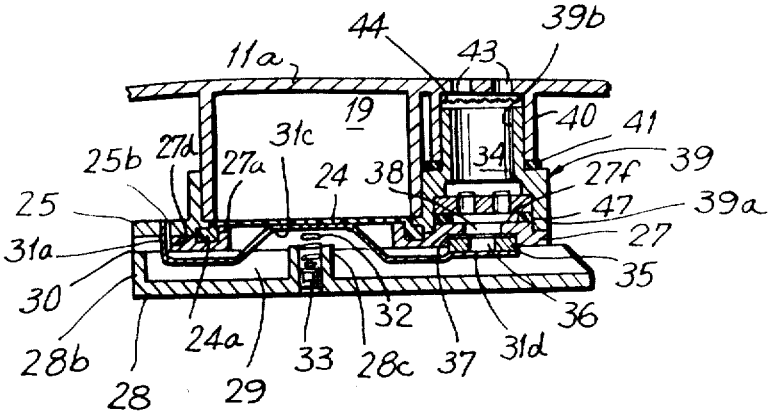
FIG. 3 is a horizontal sectional view, taken at line 3—3 of FIG. 1, illustrating the relative positions parts assume when one operating condition of the suction cleaner prevails.
Figure 4:
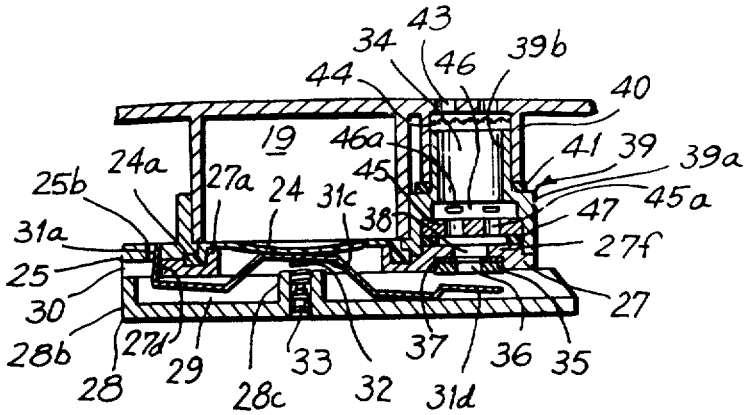
FIG. 4 is a sectional view similar to FIG. 3 illustrating the relative positions the parts assume when another operating condition of the suction cleaner prevails.

The diaphragm 24 and an outer plate 28, which overlies the intermediate plate 27, define a space 29, as best shown in FIG. 1. The upright wall 25, intermediate plate 27 and outer plate 28 are formed with aligned openings 25a, 27c and 28a, respectively, to receive suitable fastening screws (not shown). As seen in FIGS. 2, 3 and 4, the intermediate plate 27 is notched at 27d. The notch 27d, at the vicinity of the flanged end 28b of the outer plate 28, defines a passageway opening 30, whereby the space 29 is in communication with the space 15 in the casing 10.

Within the space 29 is disposed an elongated leaflike member 31 of the shape shown in FIGS. 2, 3 and 4. The member 31 is formed with a right-angle bent portion 31a at one end thereof which extends through the bottom of the notch 27d and into a slot 25b in the wall 25 which is in a part thereof outside the suction passage 19. The top and bottom edges of the bent portion 31a of the member 31 are notched at 31b, the notch at the top edge being illustrated in FIG. 2, to provide a fulcrum for the leaflike member 31 on the intermediate plate 27 at the vicinity of the notch 27d, to enable the member 31 to pivotally move between the positions shown in FIGS. 3 and 4.

The member 31 is biased to its position shown in FIG. 3 by a helical spring 32 which is disposed in a hollow sleevelike part 28c of the outer plate 28. The sleevelike part 28c is internally threaded to receive a nut 33 for adjusting the compression of the spring 32 and hence its biasing action on the member 31. In the position shown in FIG. 3 an elongated flat intermediate portion 31c of the leaflike member 31 is biased by the spring 32 toward the surface or face of the diaphragm 24 which is subject to the pressure prevailing in the space 15 in the casing 10.

The outer free end portion 31d of the leaflike member 31 serves as a valve which, depending upon the position of the member 31, closes or opens a passageway 34 leading from the space 29 to the atmosphere. The passageway 34 is defined by a collar or ring 35 which has an opening 36 and snugly fits in a recessed portion 37 of the intermediate plate 27 which has an opening 38 in alignment with the opening 36.

A hollow sleeve 39 of rectangular shape, as shown in FIG. 2, is formed integrally with the wall 25. The sleeve 39 includes a first section 39a adjacent to the intermediate plate 27 and a second section 39b adjacent to the end wall 11a of the end cover 11. The intermediate plate 27 is formed with a boss 27f at the vicinity of the opening 38 therein which snugly fits in the open end of the first sleeve section 39a. The second sleeve section 39b telescopically fits within a hollow sleeve 40 which is of rectangular shape and is formed integrally with the end wall 11a of the end cover 11. A sealing gasket 41 is provided between the open end of the sleeve 40 and a shoulder 42 of the sleeve 39.

The end wall 11a of the cover 11 is provided with openings 43 so that, when the valve 31d is in its open position seen in FIG. 4, air can flow through the passageway 34 from the space 29 exteriorly of the suction cleaner through the openings 43.

A filter 44, which may be formed of suitable material which is permeable to air, is provided in the passageway 34 at the vicinity of the openings 43. Further, members 45 and 46 are held against internal shoulders of the sleeve 39, the member 45 having vertically extending oblong openings 45a and the member 46 having metal reeds 46a closely adjacent to the openings 45a. A suitable sealing member 47 is interposed between the member 45 and the boss 27f of the intermediate plate 27.

During operation of the suction cleaner when air is drawn through the suction passageway 19 into the dirt-collecting member 16, the pressure in the suction passageway 19, at the right side of the diaphragm 24 in FIG. 1, will be the same as the pressure existing within the dust bag 16f at the side thereof which is initially contacted by the air. Since the space 29 within the device 23 is in communication with the space 15 in the casing 10 through the passageway 30, a path of flow for air will be provided so that the space 29 at the left side of the diaphragm 24 in FIG. 1 will be substantially at the same pressure as the pressure in the space 15 at the outer surface of the dust bag 16f.

When the suction cleaner is being operated dust-laden air is drawn into the dust bag 16f through the suction passageway 19. Dirt is trapped in the dust bag and air separated from such dirt passes into the space 15. When the dust bag 16f is clean, the pressure differential at opposite sides of the dust bag is relatively small. Under these conditions, the pressure in the space 29 will be effective to maintain the diaphragm 24 in such a position that the leaflike member 31, aided by the biasing action of the spring 32, will be effective to maintain the valve 31d at the outer free end of the member 31 in intimate physical contact with the collar or ring 35 which serves as a seat for the valve. Under these conditions, which is illustrated in FIG. 3, air in the space 29 cannot pass into the passageway 34.

However, when the dust bag 16f becomes clogged due to dust and dirt collected therein, the pressure in the space 15 at the outside of the dust bag 16f will be less than the pressure inside the dust bag due to the suction effect produced by the motor-fan unit. When the pressure differential at opposite sides of the dust bag 16f reaches a definite value, the pressure in the space 29 will be reduced sufficiently so that the diaphragm 24 will flex from the position shown in FIG. 3 to the position shown in FIG. 4 against the biasing action of the spring 32. When this occurs valve 31d moves from its seat or collar 35 and opens the passageway 34. Air in the space 15 in the casing 10 can flow at a relatively high velocity through the passageway 30 into the space 29 and thence through the passageway 34 and openings 43 in the end cover end wall 11a to the atmosphere. The air flowing through the passageway 34 past the metal reeds 46a will cause the latter to vibrate rapidly and produce an audible sound. When this audible sound is produced, anyone in the vicinity of the suction cleaner will become aware of the fact that the dust-collecting member 16 should be withdrawn from the casing 10 for cleaning the latter or a fresh filter bag should be provided in the event that paper dust bags of the throwaway type are provided.

Heretofore it has been the practice to employ signaling and indicating devices in which the diaphragm 24 moves gradually from the position shown in FIG. 3 to the position shown in FIG. 4 which means that the valve 31d in turn will move gradually from its seat on the collar or ring 35 as the bag 16f becomes more and more clogged due to dust and dirt collected therein. Under these conditions the audible sound produced by the signaling device initially is weak and gradually increases in intensity as the rate at which air flows through the passageway 34 increases.

In order to provide a signaling device which produces an audible sound of high intensity from the very moment when it becomes operative, so as to positively indicate a clogged condition of the dust bag 16f which impairs the cleaning ability of the suction cleaner, the collar or ring 35 is a magnet and the leaflike member 31 serves as an armature member therefor which is formed at least in part of magnetic material. When the dust bag 16f is clean, the pressure differential at opposite sides of the dust bag is relatively small, as explained above, and the parts of the device 23 will assume the relative positions shown in FIG. 3 and the armature member 31 will be attracted by the ring magnet 35 and the valve 31d will be in its seated position on the ring magnet.

As the dust bag 16f becomes clogged with dust and dirt during operation of the suction cleaner, the pressure differential at opposite sides of the dust bag 16f gradually increases and the diaphragm flexes from a first position shown in FIG. 3 to one of several second positions, one of which is shown in FIG. 4. In FIG. 3 it will be seen that the armature member 31 is not acted upon by the diaphragm 24 when the latter in in its first position. In any event, the diaphragm 24 will not be effective to move the valve 31d from its closed position in FIG. 3 to its open position in FIG. 4 until the leaflike member 31 is acted upon by a force generated or developed by the diaphragm 24 in one of its second positions which exceeds the force magnetically attracting the member 31 to the ring magnet 25, such force developed by the diaphragm being dependent upon the pressure differential at opposite sides of the dust bag 16f. When this occurs the valve 31d will move practically instantaneously from a fully closed position to a fully open position and air at a high velocity will flow through the passageway 34 so that the reeds 46a, from the very moment when they begin to vibrate, will produce an audible sound of high intensity.

A sudden flow of air through the passageway 34 when valve 31d opens possesses the advantage that foreign matter tending to collect in the opening 45a of the member 45 will be forcibly removed therefrom and prevent sticking of the vibrating reeds 46a at the openings 45a. Such sticking of the reeds 46a, which often tends to persist when the initial velocity of air through the passageway 34 is not high, renders the signal device ineffective. By insuring flow of air at a high velocity through the passageway 34 when the valve 31d opens, a distinctive audible signal always will be produced which leaves no doubt in the mind of the user that the dirt-collecting member 16 should be cleaned or replaced.

I claim:

[1. In a suction cleaner of the class described having a casing provided with an inlet and outlet for air adapted to flow therethrough and a dust bag therein for removing dirt from the air, the pressure differential at opposite sides of said dust bag becoming increasingly greater responsive to dirt trapped at the side thereof initially contacted by the air, the combination of a device for indicating the need for cleaning or replacing the dust bag due to dirt trapped therein, said device comprising a magnet and an armature member which is adapted to be magnetically attracted by said magnet and movable therefrom, and means responsive to a force which is dependent upon the pressure differential at opposite sides of said dust bag and exceeds the force magnetically attracting said armature member to said magnet to move said armature member from said magnet to render said device operable to produce said indication.]

[2. Apparatus as set forth in claim 1 which includes means for biasing said armature member toward said magnet.]

[3. Apparatus as set forth in claim 1 in which said device produces said indication with the aid of air and includes an element which has a passageway therein and defines a valve seat, and valve means which is movable to and from said seat with movement of said armature member to and from said magnet, said valve means moving from said seat with movement of said armature member from said magnet for effecting flow of air through said passageway to render said device operable to produce said indication.]

[4. Apparatus as set forth in claim 3 in which said valve means is carried by said armature member.]

[5. Apparatus as set forth in claim 3 in which said magnet is apertured and forms a part of said element and serves as said valve seat.]

[6. Apparatus as set forth in claim 5 in which said valve means comprises a part of said armature member which overlies said apertured magnet and closes said passageway when said armature member is magnetically attracted by said magnet.]

[7. In a suction cleaner of the class described having a casing provided with an inlet and outlet for air adapted to flow therethrough and a dust bag therein for removing dirt from the air, the pressure differential at opposite sides of said dust bag becoming increasingly greater responsive to dirt trapped at the side thereof initially contacted by the air, the combination of a device for indicating the need for cleaning or replacing the dust bag due to dirt trapped therein, said device comprising a magnet and an armature member which is adapted to be magnetically attracted by said magnet and movable therefrom, a diaphragm movable from a first position to one of several second positions responsive to the pressure differential at opposite sides of said dust bag, and said armature member being movable from said magnet to render said device operable to produce said indication responsive to a force which is dependent upon the particular second position to which said diaphragm is moved and which exceeds the force magnetically attracting said armature member to said magnet.]

[8. Apparatus as set forth in claim 7 in which said diaphragm in its first position is ineffective to produce a force which exceeds the force magnetically attracting said armature member to said magnet.]

[9. Apparatus as set forth in claim 7 which includes resilient means for biasing said diaphragm toward its first position.]

[10. Apparatus as set forth in claim 9 in which said resilient means also biases said armature member toward said magnet.]

*11. In a suction cleaner of the class described having a casing provided with an inlet and outlet for air adapted to flow therethrough and a dust bag therein for removing dirt from the air, the pressure differential at opposite sides of said dust bag becoming increasingly greater responsive to dirt trapped at the side thereof initially contacted by the air, the combination of*

*(a) a device for producing an audible signal with the aid of air to indicate the need for cleaning or replacing the dust bag due to dirt trapped therein,*

*(b) said device comprising structure including a magnet and an armature member which is adapted to be magnetically attracted by said magnet and movable therefrom, said structure defining a passageway having a valve seat at the inlet end thereof,*

*(c) valve means which is movable to and from said seat with movement of said armature member to and from said magnet, and*

*(d) means responsive to a force which is dependent upon the pressure differential at opposite sides of said dust bag and exceeds the force magnetically attracting said armature member to said magnet to move said armature member from said magnet, said valve means moving from said seat with movement of said armature member from said magnet for effecting flow of air through said passageway to render said device operable to produce said audible signal.*

*12. Apparatus as set forth in claim 11 in which said valve means is carried by said armature member.*

*13. Apparatus as set forth in claim 11 in which said magnet is apertured and defines a part of said passageway and serves as a valve seat.*

*14. Apparatus as set forth in claim 13 in which said valve means comprises a part of said armature member which overlies said apertured magnet and closes said passageway when said armature member is magnetically attracted by said magnet.*

References Cited

The following references, cited by the Examiner, are of record in the patented file of this patent or the original patent.

UNITED STATES PATENTS

| | | | |
|---|---|---|---|
| 2,270,318 | 1/1942 | Leathers | 116—65 |
| 2,750,915 | 6/1956 | Carlberg | 116—114 |
| 2,815,733 | 12/1957 | Rykert | 116—114 |
| 3,154,049 | 10/1964 | Smith et al. | 116—70 |
| 3,250,873 | 5/1966 | Kudlaty et al. | 200—83 |
| 3,279,418 | 10/1966 | Nilsson | 116—70 |

LOUIS J. CAPOZI, Primary Examiner

U.S. CL. X.R.

15—339; 116—70, 112; 210—90